3,436,897
METHOD OF AND APPARATUS FOR
CHROMATOGRAPHIC SEPARATIONS
Richard P. Crowley, Milton, Mass., assignor to Abcor,
Inc., Cambridge, Mass., a corporation of Massachusetts
Continuation of application Ser. No. 644,302, June 7,
1967. This application May 13, 1968, Ser. No. 728,851
Int. Cl. B01d 15/08
U.S. Cl. 55—67                                22 Claims

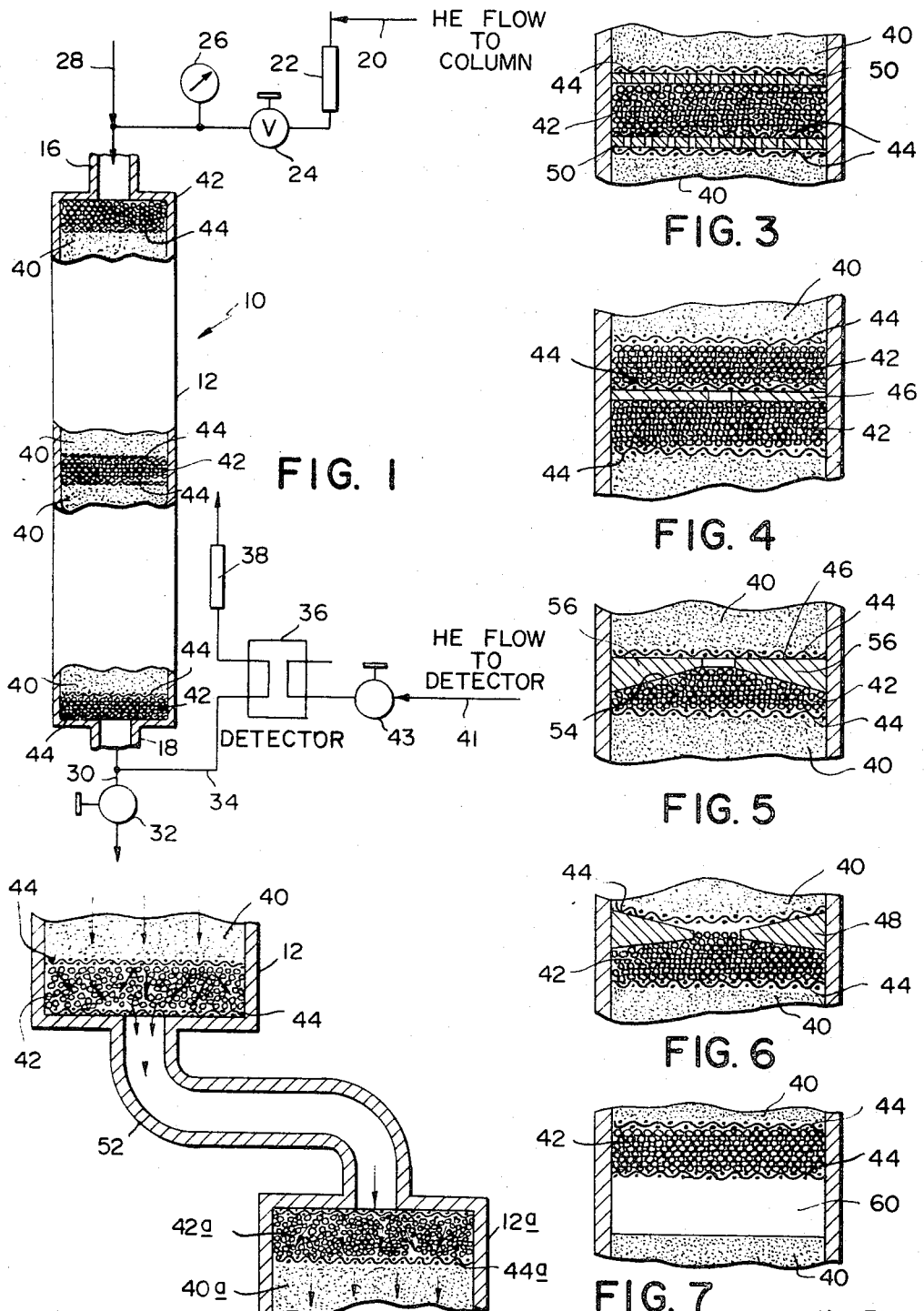

ABSTRACT OF THE DISCLOSURE

An improved chromatographic column is provided which is particularly useful for relatively large diameter columns with both gas and liquid chromatography. The improved column containing separatory material is provided by a separate layer across the column diameter of relatively large particle size particulate material to promote transverse or lateral movement of the fluids moving axially through the column. The layer also provides relatively large diameter interstitial void mixing spaces for the fluid during its passage through the layer. The large particle size layer of particulate material may be in combination with both doughnut type baffles and baffles having a plurality of flow passages therein such as sieve plates. Where multiple column sections are employed relatively large size particulate material may be used at the outlet of one column section and/or the inlet of the next column section to enhance the resolving power of the chromatographic column.

---

This application is a continuation of Ser. No. 644,302 filed June 7, 1967 now abandoned.

Background of the invention

One of the difficulties which has tended to suppress the employment of chromatographic techniques for the separation of materials on a commercial scale has been the tendency of chromatographic columns to lose resolving power and separatory ability as the diameter of the column increases. The scaling up of relatively small diameter laboratory analytical chromatographic columns of ¼ to 1 inch to relatively large diameter columns four inches or more has often failed to give comparative separation of resolving power. In fact, in large diameter columns with both gas and liquid chromatographic techniques there is often a rapid diminution in effective separatory ability as the column diameter increases.

To improve the resolving power of chromatographic columns the use of various internal partition elements or obstructors has been first described in U.S. Patent No. 3,250,058, issued May 10, 1966 entitled "Method of and Apparatus for Chromagraphic Separations" to Raymond Baddour. Particular arrangements of partition elements have also been described in later patents such as in South African application 66/3,204 published Dec. 21, 1966 and in U.S. Patent No. 3,310,932, issued Mar. 28, 1967. Some partition elements previously described have used sieve plates alone, and in combination with doughnut type elements within the chromatographic column with and without an empty mixing space between the elements to induce lateral flow and radial mixing and subsequent redistribution of the fluid streams flowing axially through the column. Partition elements containing a plurality of flow passages therein, such as sieve plates in pairs, and one or more elements in combination with a doughnut type element have been employed in sandwich type structures wherein a hollow flat disc-like mixing space is provided between the elements within the column.

Further, the use of grains of packing material having a cross-section dimension greater than one-fifth of the inner diameter of a chromatographic column has been suggested with analytical chromatographic columns of less than 1 mm. in diameter to greatly increase the speed of separation within the column by increasing the flow velocity of the fluid as set forth in U.S. Patent No. 3,283,483 to Halasz et al. issued Nov. 8, 1966. In this technique, a narrow capillary type chromatographic column entirely packed with very large size particles creates a series of open interstitial spaces between the particles connected by narrow passage around the particles, thereby greatly increasing the flow velocity of the streams through the connecting passages between the particles. Such technique has been directed only toward very narrow columns and requires certain criticality in both particle size relative to the internal diameter of the column as well as the interstitial void space.

Summary of the invention

My invention relates to an improved method of an an apparatus for the chromatographic separation of fluid streams and in particular to the method of and an apparatus for promoting the separation of materials in relatively large diameter chromatographic columns used for both gas and liquid chromatography.

I have discovered that the separatory ability of relatively large diameter chromatographic columns is enhanced by incorporating, with the packed column, distinct and separate layers of particulate material having a different particle size than the separatory material used in the column and in particular relatively large particle size particulate material within the regular separatory material of the packed bed. These layers should extend preferably across the entire cross-sectional area of the internal column diameter at defined intervals within the column on one or more column sections. The larger size particulate material in such layers is employed to periodically induced lateral flow of the fluid stream moving through the column, while the larger individual interstitial void mixing spaces created between the particulate material permits localized mixing of such streams as the streams move through the particulate layer. The use of larger size particles permit better distribution of the fluids due to the reduction in pressure drop as the fluid stream moves through the layer. The larger size of the particles forces transverse mixing of the stream due to the difference in particles size (i.e. the random walk of the fluid is greater) while the pressure drop in the layers induces distribution of the fluids.

I have found that one or more particulate layers alone or in combination with partition elements containing one or more flow passages and/or mixing spaces, provide improved resolution for the column. My layers of particulate material may be within the packed bed of separatory material of a single column, or one or more layers may be employed in a series of interconnecting columns. In general and depending upon the column diameter and the particular resolving power required, my layers may have a depth of from about 10 to 100 percent of the internal column diameter and may vary in position and frequency in the column. The depth should be sufficient to improve the resolving power desired within each column or column section. It is often preferable to employ at least one layer at the inlet of the column and another layer at the outlet of the column particularly where there are interconnecting columns.

My particulate layers may also be profitably employed with a variety of partition elements such as sieve plates and/or doughnut type elements. For example, my particulate layers may be employed between a pair of sieve plates or other partition elements having one, or a plurality of flow passages and where so employed the sieve plates need not have the flow passages substantially non-aligned with the flow passages of the preceding plate, since the itervening large particle size particulate layer will prevent the direct flow passage of the fluid in an axial flow from one to the other sieve plate.

The particle size of my particulate material may vary depending upon the amount and extent of lateral movement and mixing desired. However, my particulate layer should provide a smaller number of interstitial void spaces between the particles than the regular separatory material, but with each individual space being greater in volume than that of the separatory material regularly employed. For example, the total interstitial void space of a layer of similar depth of the separatory material and my particulate material may be substantially the same, however, my particulate layer will present a greater volume of each individual mixing space. In general, the particle size of my particulate layer may range from about 2 to 20 times the particle size of the regulator separatory material, for example, three to five times. In the practice of my invention, the particle size should be greater than the particle size of the regular separatory material, but less than about one-tenth ($\frac{1}{10}$) of the internal column diameter. Preferably the particles should be spherical-type beads of generally uniform size. Selection of the spherical particle size depends upon a number of factors. Larger particles reduce the pressure drop and improve the individual lateral flow or random walk steps of the fluids, but particles which are too large create unevenness in fronts and undesirable flow velocities.

In a typical embodiment each of the divided particles of chromatographic separatory material employed in a gas chromatographic column, may be crushed firebrick of 60 to 80 mesh with a liquid partitioning element on the surface thereof, while my particulate layer would comprise particulate bead material, such as crushed firebrick carrying a particle size of 10 to 20 mesh or less. My particulate layer may be comprised of the same or different separatory material as employed within the packed bed of the column or may be non-separatory material or a mixture thereof. The particle size of each particulate layer in each column may be the same or may vary in particle size from layer to layer as required. The particulate layers may have the individual particles therein held together within a package of a sandwich type structure contained by screens or partition elements with one or more flow passages. My particulate layers may be employed in chromatographic columns used in both gas and liquid chromatographic techniques and with or without the use of carrier fluids, gas or liquid, to drive the sample material through the column.

The form of my particulate material may vary, however, the preferred form of my layer comprises subdivided spherical or bead like particles. My particulate layer in another preferred embodiment would comprise particles of the same separatory material as in the packed bed, but of larger particle size in order to continue the chromatographic separating process as the fluid sample stream flows through the particulate layer. Non-separatory type material may be employed in my particulate layers.

My particulate layer may be prepared from a wide variety of subdivided bead material both organic and inorganic. For example, in gas chromatographic columns, my particulate material may be formed from activated carbon, crushed firebrick, diatomaceous earth, molecular sieves, glass, alumina, resin particles like beads of polystyrene, metals both with or without liquid or other material coated on the surface thereof for separatory purposes. In liquid chromatography, my improved columns with a particulate layer may be formed of large size polymeric particles or other bead material which promotes the separation of the liquid fraction by absorption or flowing through interstitial area of defined size within or between the particles. Typical liquid chromatographic separatory material would comprise resin or styrene copolymeric particles which promote the separation of polymeric fractions of different molecular weights such as Poropak and the like.

*Brief description of the drawings*

FIG. 1 is a schematic and partial cross-section representation of a chromatographic apparatus including in particular a chromatographic column containing large particle size particulate layers.

FIG. 2 is a partial and enlarged cross-sectional representation of my particulate layers employed wherein two or more chromatographic column sections are connected.

FIGS. 3-7 are enlarged fragmentary cross-sectional representations of various arrangements of particulate layers alone and in combination with partition elements within a chromatographic column.

*Description of the preferred embodiment(s)*

FIG. 1 shows a chromatographic apparatus 10 comprising an elongated cylindrical column 12 having an inlet 16 and an outlet 18 and containing therein a bed of finely divided particles such as crushed firebrick having a thin film of liquid partitioning material on the surface thereof and capable of effecting the chromatographic separation of a fluid stream such as a cis-transpentene stream into two or more chromatographic components. The crushed firebrick has an average particle size of 80 to 100 mesh. A carrier fluid such as an inert gas like helium or nitrogen is permitted to flow from a source (not shown) to an inlet conduit 20 containing a flow metering device 22, a flow control valve 24 and pressure measuring device 26 to the column inlet 16. A conduit 28 permits the introduction of a gas sample material to be chromatographically separated into the inlet 16. Outlet 18 is in fluid flow communication with an outlet conduit 30 containing a flow control valve 32 and a sampling conduit 34. The sampling conduit withdraws a portion of effluent material from the chromatographic column and continually passes it to a detecting device such as a thermoconductivity cell 36 and then to a flow meter 38 such as a capillary type flow meter. The detecting device identifies the particular components being withdrawn from the column by detecting the thermo-conductivity of the sample gas in comparison to the carrier gas. The carrier gas serves as a base reference for comparison purposes in the thermo-conductivity cell 36 and is passed to the detector 36 from the reference conduit 41 containing flow control valve 43. The detector 36 may also be an electrical communication with a graph type recorder and an integrator.

Within the chromatographic column 12 containing the separatory material 40 is located a series of particulate layers composed of, for example, the same separatory material that is employed within the column, that is crushed firebrick with a liquid partitioning material on the surface or non-separatory material like beads of a styrene resin, and each having a particle size of about 5 to 10 mesh. Screens 44 are provided to separate the particulate layers 42 from the separatory material 40 to prevent the intermixing of the two materials. One layer is located directly adjacent the inlet 16 of the column to permit the material being introduced along with the carrier fluid to spread laterally and to be introduced into the column in plug-like form. The particulate layer located within the body of the column 12 is to provide for lateral movement and radial mixing of the gas sample and carrier streams as they pass axially through the column. While directly adjacent the outlet 18 is located another layer of particulate material. In operation, the gas sample stream is driven axially through the column by the carrier stream and separated into distinct chromatographic fractions by the separatory material. The particulate layers 42 induce lateral flow of the streams as they move through the column and therefore provide for improved resolution.

FIG. 2 is an illustration wherein particulate layers are employed in combination at the outlet of one chromatographic column just prior to a connecting tube 52 between the outlet of one column and the inlet of the next column section 12a. In this embodiment the chromatographic columns 12 and 12a may be employed with or without any further particulate layers other than the particulate layers at the respective outlet and inlet in each pair of columns. Where more than two columns are interconnected, particulate layers can be employed at the inlets and outlets of all columns. In this arrangement the gas sample and the carrier streams are passed through the first particulate layer and further radially mixed as they join to pass through the connecting tube 52 and thereafter the radially mixed streams are distributed back into the separatory material 40 of the column 12a by the particulate layer at the inlet. FIG. 2 illustrates a connecting tube 52 between column 12 and 12a which tube is empty and relatively short. However, where desired, this tube and the connection 52 can be packed with my particulate material or with the same or different separatory material employed within the columns.

FIG. 3 shows a particulate layer 42 employed within a chromatographic column between a pair of partition elements each having a plurality of flow passages, such as is illustrated by a pair of sieve plates 50 or sintered metal fibers or particles, or porous ceramic elements. The flow passages of the sieve plates 50 may or may not be substantially axially aligned, since the intervening layer of particulate material avoids the difficulties of employing sieve plates with aligned flow passages.

FIG. 4 shows a pair of particulate layers on either side of a doughnut type element 46 having a central flow passage. The fluid material after proceeding through the first upstream particulate layer moves inwardly through the flow passage, while the following or downstream particulate layer redistributes the radially mixed fluids from the first particulate layer and the doughnut partition element back into the separatory material of the column.

FIG. 5 illustrates a combination of another type partition element 46 employed in combination with a downstream particulate layer wherein the downstream side of the doughnut element 46 is outwardly flared or tapered 54 to aid in redistributing the mixed fluids back into the column. The particulate layer 46 has greater depth in the center than the edges to permit a more uniform front of fluid to be formed.

FIG. 6 illustrates a tapered type doughnut element 48 followed directly by a particulate layer. The tapered doughnut partition element 48 is tapered both upstream and downstream and is used to induce flow of the sample and carrier fluids towards and away from the central flow passage. The tapered shape prevents pockets of material from forming against the interior wall of the column. In the figures as illustrated screens 44 are employed to prevent the separatory material in the column from entering the flow passages of the partition element or mixing with my particular layers.

FIG. 7 illustrates the use of a particulate layer alone without partition elements but in combination with a small disc-like empty mixing space 60 directly downstream of the layer so that fluids mixed in the layer may be redistributed by the greater pressure drop in the mixing space and across the upstream face of the separatory material 40 before introduction in the next separatory section of the column.

My invention has been described for the purposes of illustration only in connection with a gas chromatographic system, however, my invention may also be employed in other gas and liquid chromatographic systems. My invention has been illustrated in the drawings in various embodiments which illustrations are in no way intended to limit the scope of my invention.

What I claim is:
1. A chromatographic column characterized by an inlet for the introduction of a fluid sample stream to be separated and an outlet for the withdrawal of at least one chromatographic component and which column contains particulate separatory material therein and a means to improve the resolving power of the column which means includes at least one separate particulate layer of bead material extending across the internal diameter of the column, the layer composed entirely of bead material having a particle size of from 2 to 20 times greater than the separatory material employed within the column, and means within the column for maintaining the separatory material and the bead material in distinct layers and for preventing mixing of the particles of the separatory material and the bead material with one another.

2. The column of claim 1 wherein the depth of the particulate bead layer within the column varies from about 10 to 100 percent of the internal diameter of the column.

3. The column of claim 1 wherein the material of the particulate bead layer comprises a material different than the separatory material employed in the column.

4. The column of claim 1 wherein the column includes at least two particulate bead layers and one particulate bead layer is adjacent at least one end of the column.

5. The column of claim 1 wherein the column includes at least two column sections, wherein the outlet of the first column is connected to the inlet of the second column and wherein one particulate bead layer is directly adjacent the outlet of the first column and another particulate bead layer is directly adjacent the inlet of the second column.

6. The column of claim 5 wherein the outlet of the first and inlet of the second columns are connected by a connecting tube which contains no material therein.

7. The column of claim 1 which contains a mixing space directly downstream of the particulate bead layer.

8. The column of claim 1 wherein the particulate bead layer includes at least one partition element containing at least one flow passage therein directly adjacent the particulate bead layer.

9. The column of claim 1 wherein the particulate bead layer includes partition elements containing a plurality of flow passages on either side of the particulate bead layer.

10. The column of claim 1 which includes a partition element having a central flow passage therein located within the particulate bead layer.

11. The column of claim 1 which includes a partition element characterized by a central flow passage therein adjacent to and directly upstream of the particulate bead layer.

12. The column of claim 11 which includes a partition element having at least one face which slopes inwardly toward the central portion of the column.

13. The column of claim 1 wherein the particle size of the bead material of the particulate bead layer is greater than the particle size of the separatory material employed within the column but less than about one-tenth ($\frac{1}{10}$) of the internal diameter of the column.

14. The column of claim 1 wherein the bead material employed within the column is not separatory in nature for the fluid sample stream.

15. The column of claim 1 wherein the thickness of the particulate bead layer is generally uniform.

16. The column of claim 1 wherein the particle size of the bead material is substantially uniform.

17. A chromatographic apparatus for the separation of a fluid sample stream into one or more chromatographic components which comprises in combination:
(a) a chromatographic column adapted to be used in a chromatographic system and which column contains particulate separatory material therein for the chromatographic separation of a fluid sample stream and means to improve the resolving power of the column which means includes at least one separatory particulate layer of bead material extending across the internal diameter of the column, the layer composed of bead material having a particle size 2 to 10 times greater than the particulate separatory material employed within the column, the bead material composed of a different material than the particulate separatory material and the depth of the layer ranging from about 10 to 100 percent of the internal diameter of the column; means within the column for maintaining the separatory material and the bead material in distinct layers for preventing mixing of the particles of the separatory material and the bead material with one another;

(b) means to introduce a fluid sample stream into the column;

(c) means to introduce a carrier fluid into the column;

(d) means to withdraw at least one chromatographic component of the fluid sample stream from the column; and (e) means to detect at least one chromatographic component so withdrawn from the column.

18. A process for the chromatographic separation of components from a fluid sample stream which process comprises:

introducing a fluid sample stream into a chromatographic column having particulate separatory material therein;

passing said sample stream through the interstices of the separatory material;

selectively retarding the passage of at least one chromatographic component;

obstructing the flow of the sample stream moving axially through the column by interposing a layer of particulate bead material within the separatory material of the column, the bead material defining interstices greater than the interstices defined by the separatory material, and the bead material being a particle size of from about 2 to 20 times greater that the separatory material;

maintaining the separatory material and the bead material in layers separate from one another, so that mixing of the particulate material with the bead material is inhibited;

flowing said sample stream through the interstices defined by the bead material thereby providing lateral flow and radial mixing of the sample stream; and withdrawing the separated components of the sample stream from the column.

19. The process of claim 18 which includes introducing a fluid carrier stream into the column to drive the sample stream axially through the column.

20. The process of claim 18 which includes detecting the components of the sample stream so withdrawn from the column.

21. The process of claim 18 wherein the interstices of the bead material are generally uniform.

22. The process of claim 18 wherein the fluid sample stream is a gas stream.

References Cited

UNITED STATES PATENTS

| | | | |
|---|---|---|---|
| 3,310,932 | 3/1967 | Melpolder | 55—386 |
| 3,334,514 | 8/1967 | Catravas | 55—386 X |
| 3,398,512 | 8/1968 | Perkins et al. | 55—386 |

FOREIGN PATENTS

| | | |
|---|---|---|
| 663,204 | 5/1966 | South Africa. |

OTHER REFERENCES

Scott, R. P. W.: Gas Chromatography, 1960, Butterworths, London, England, pp. 240–241.

REUBEN FRIEDMAN, *Primary Examiner.*

J. L. DECESARE, *Assistant Examiner.*